(12) United States Patent
Li

(10) Patent No.: US 10,409,748 B2
(45) Date of Patent: Sep. 10, 2019

(54) BRIDGE DEVICE WITH DMA DATA TRANSFERRING TO UPSTREAM DEVICE WITH RESET AND CLEAR FEATURE COMMAND

(71) Applicant: ASMedia Technology Inc., New Taipei (TW)

(72) Inventor: Kuo-Lung Li, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 0 days.

(21) Appl. No.: 16/027,280

(22) Filed: Jul. 4, 2018

(65) Prior Publication Data
US 2019/0108151 A1    Apr. 11, 2019

(30) Foreign Application Priority Data
Oct. 11, 2017  (TW) .............................. 106134777 A

(51) Int. Cl.
G06F 13/00    (2006.01)
G06F 13/28    (2006.01)
G06F 13/40    (2006.01)
G06F 13/42    (2006.01)
G06F 13/16    (2006.01)

(52) U.S. Cl.
CPC .......... *G06F 13/28* (2013.01); *G06F 13/1642* (2013.01); *G06F 13/1673* (2013.01); *G06F 13/4027* (2013.01); *G06F 13/4282* (2013.01)

(58) Field of Classification Search
CPC ...................................................... G06F 13/28
See application file for complete search history.

(56) References Cited

U.S. PATENT DOCUMENTS 6,718,282 B1 * 4/2004 Xu ...................... G06F 11/3495
                                                        702/182
7,430,619 B2    9/2008 Tsutsui
9,182,996 B2    11/2015 Kempka
2011/0016267 A1  1/2011 Lee et al.

FOREIGN PATENT DOCUMENTS

TW    200905483 A    2/2009
TW    201235862 A    9/2012

* cited by examiner

*Primary Examiner* — Tammara R Peyton
(74) *Attorney, Agent, or Firm* — CKC & Partners Co., LLC

(57) ABSTRACT

A bridge device includes a first physical layer circuit, a first buffer memory, a DMA controller, and a processor. The first physical layer circuit is configured to connect to an upstream device. The first buffer memory is configured to store a first data and transfer data to the upstream device via the first physical layer circuit. The DMA controller is coupled to the first buffer memory and configured to access the first data in the first buffer memory to read and/or write a storage device correspondingly. The processor is coupled to the first buffer memory and the DMA controller. When the bridge device receives a clear feature command from the upstream device, the processor is configured to reset the first buffer memory and the DMA controller to stop the data transferring between the upstream device and the bridge device.

18 Claims, 4 Drawing Sheets

BRIDGE DEVICE WITH DMA DATA TRANSFERRING TO UPSTREAM DEVICE WITH RESET AND CLEAR FEATURE COMMAND

This application claims priority to Taiwan Application Serial Number 106134777, filed Oct. 11, 2017, which is herein incorporated by reference.

BACKGROUND

Technical Field

The present disclosure relates to a data transferring method, and in particular, to the data transferring method of a bridge device.

Description of Related Art

Recently, more and more external storage devices apply solid state drive (SSD) to store digital data. However, in the current data transferring process, when a fail occurs in transferring the data packet and then the transmission restarts, tag identification overlapping occurs and significantly lowers the speed of reading/writing the external storage device.

SUMMARY

One aspect of the present disclosure is a bridge device. The bridge device includes a first physical layer circuit, a first buffer memory, a DMA controller, and a processor. The first physical layer circuit is configured to connect to an upstream device. The first buffer memory is configured to store a first data and transfer data to the upstream device via the first physical layer circuit. The DMA controller is coupled to the first buffer memory and configured to access the first data in the first buffer memory to read and/or write a storage device correspondingly. The processor is coupled to the first buffer memory and the DMA controller. When the bridge device receives a clear feature command from the upstream device, the processor is configured to reset the first buffer memory and the DMA controller to stop the data transferring between the upstream device and the bridge device.

Another aspect of the present disclosure is a data transferring method. The data transferring method includes: transferring data between an upstream device and a first buffer memory in a bridge device via a first physical layer circuit; accessing a first data stored in the first buffer memory by a DMA controller in the bridge device, in order to read or write a storage device correspondingly; and resetting the first buffer memory and the DMA controller by the processor to stop the data transferring between the upstream device and the bridge device when the bridge device receives a clear feature command from the upstream device It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. That is, unless explicitly stated within the context, these terms do not indicate or imply the order or the sequence, and do not meant to limit the present disclosure.

Figure 1:
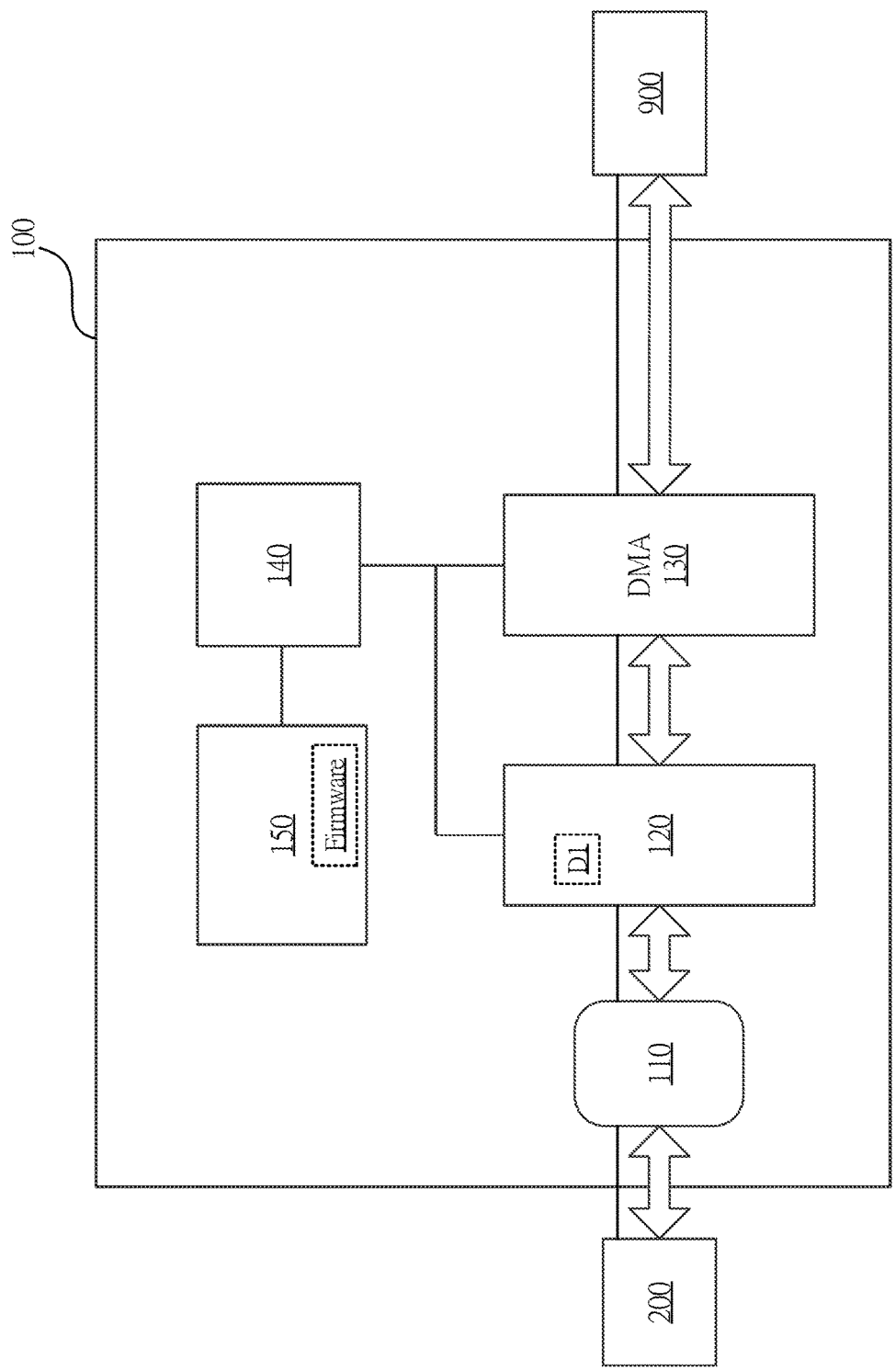
FIG. 1 is a diagram illustrating a bridge device according to some embodiments of the present disclosure.

Reference is made to FIG. 1. FIG. 1 is a diagram illustrating a bridge device 100 according to some embodiments of the present disclosure. The bridge device 100 is configured to connect between an upstream device 200 and a storage device 900 in order to transfer data.

As shown in FIG. 1, in some embodiments, the bridge device 100 includes a physical layer circuit 110, a buffer memory 120, a direct memory access (DMA) controller 130, a processor 140 and a memory 150.

In the present embodiments, the port physical layer (PHY) circuit 110 is configured to connect to the upstream device 200 as a transmission interface between the upstream device 200 and the bridge device 100.

The buffer memory 120 is electrically coupled to the physical layer circuit 110 and configured to store a first data D1, so as to transfer data to the upstream device 200 via the physical layer circuit 110. When the upstream device 200 writes data, the buffer memory 120 may, via the physical layer circuit 110, store the data D1. When the upstream device 200 reads data, the buffer memory 120 may, via the physical layer circuit 110, output the data D1 to the upstream device 200.

The direct memory access (DMA) controller 130 is electrically coupled to the buffer memory 120 and configured to access the first data D1 in the buffer memory 120, in order to read or write the storage device 900 correspondingly.

In the present embodiments, the processor 140 is electrically coupled to the buffer memory 120 and the DMA controller 130. The memory 150 is electrically coupled to the processor and configured to store a firmware. The processor 140 is configured to execute the firmware to control the buffer memory 120 and the DMA controller 130 to achieve the data transfer.

Figure 2:
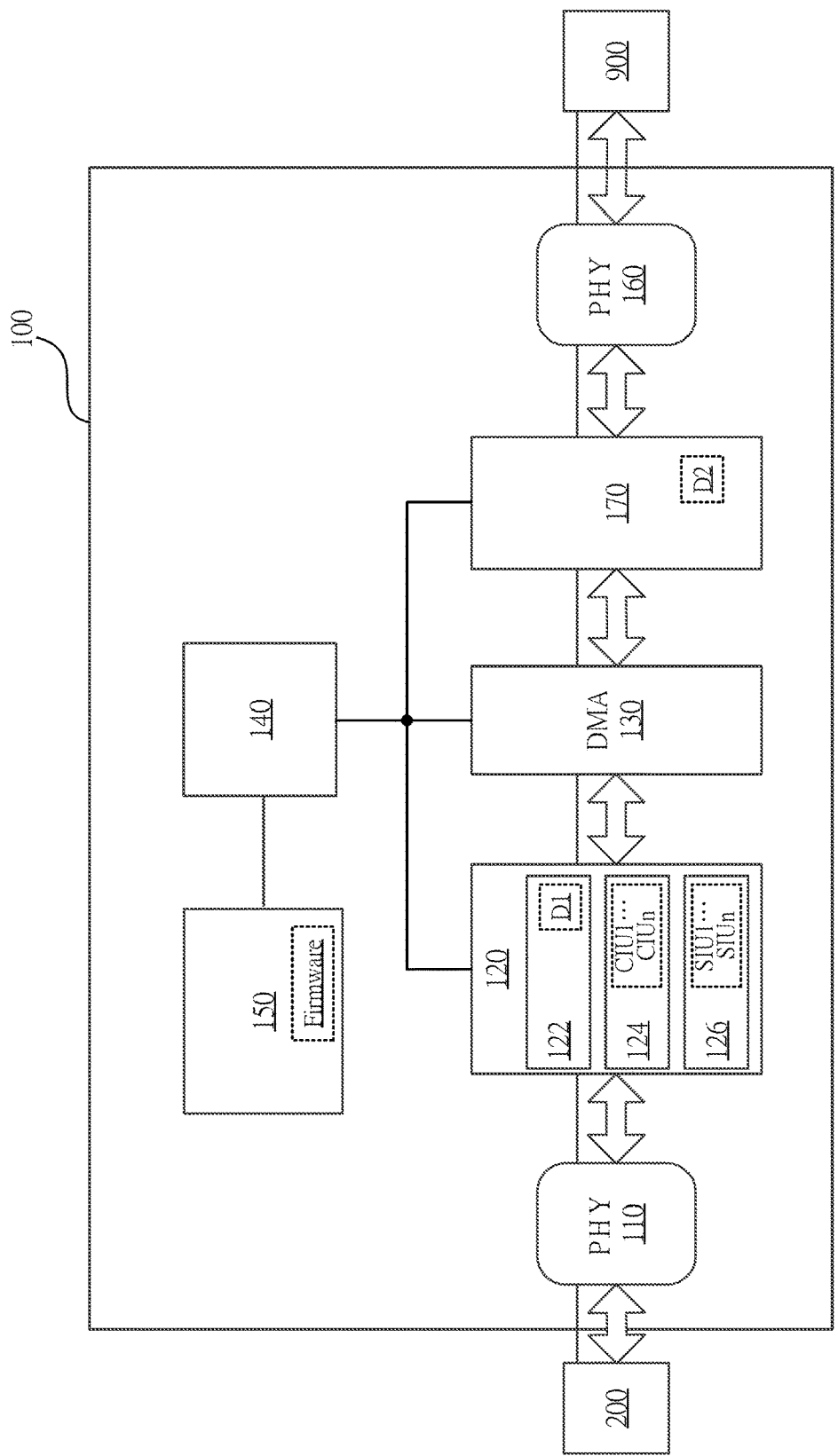
FIG. 2 is a diagram illustrating the bridge device according to some embodiments of the present disclosure.

Reference is made to FIG. 2. FIG. 2 is a diagram illustrating the bridge device 100 according to some embodiments of the present disclosure. In the present disclosure, the bridge device 100 may be connected to the upstream device 200 and the storage device 900 via different interfaces. In one embodiment, the upstream device 200 may be a computer and connects to the bridge device 100 via a universal serial bus (USB) interface. The storage device 900 may be an external hard disk device and connects to the bridge device 100 via a Serial Advanced Technology Attachment (SATA) interface. Thus, the upstream device 200 and the storage device 900 using different data transfer interfaces may perform bi-directional read/write data transmission by the bridge device 100.

In the present embodiment, the buffer memory 120 includes a bulk buffer 122, a command queue 124, and a status queue 126. The bulk buffer 122, the command queue 124, and the status queue 126 may be implemented with a First-In-First-Out (FIFO) data structure.

The bulk buffer 122 is configured to store the data D1 required for data transfer as stated in the above embodiments. The command queue 124 is configured to store one or more command Information units CIU1-CIUn, in which the command Information units CIU1-CIUn are control transmission commands sent from the upstream device 200 and respectively include corresponding tag identifications (tag IDs) ID1-IDn.

The status queue 126 is configured to store one or more status information units SIU1-SIUn, in which the status information units SIU1-SIUn also respectively include corresponding tag IDs ID1-IDn to indicate the execution status of the corresponding command Information units CIU1-CIUn.

In the embodiments shown in FIG. 2, the bridge device 100 further includes a physical layer circuit 160 and a buffer memory 170. The physical layer circuit 160 is configured to connect to the storage device 900 as a transmission interface between the storage device 900 and the bridge device 100. The buffer memory 170 is configured to store a second data D2, so as to transfer data to the storage device 900 via the physical layer circuit 170. In the present embodiment, the DMA controller 130 is further electrically coupled to the buffer memory 170 and configured to access the second data D2 in the buffer memory 170 to read or write the storage device correspondingly.

Accordingly, the processor 140 may be configured to execute the firmware to control operations of the buffer memory 120, the DMA controller 130 and the buffer memory 170, so as to control the DMA controller 130 exchanges the data D1 and data D2 in the buffer memory 120 and the buffer memory 170. Thus, the upstream device 200 (e.g., the computer) may read or write data in the storage device (e.g., external hard disk). For the continence of explanation, the data transferring method executed by the processor 140 will be discussed in the following paragraphs in accompanying with the figures and the embodiments.

Figure 3:
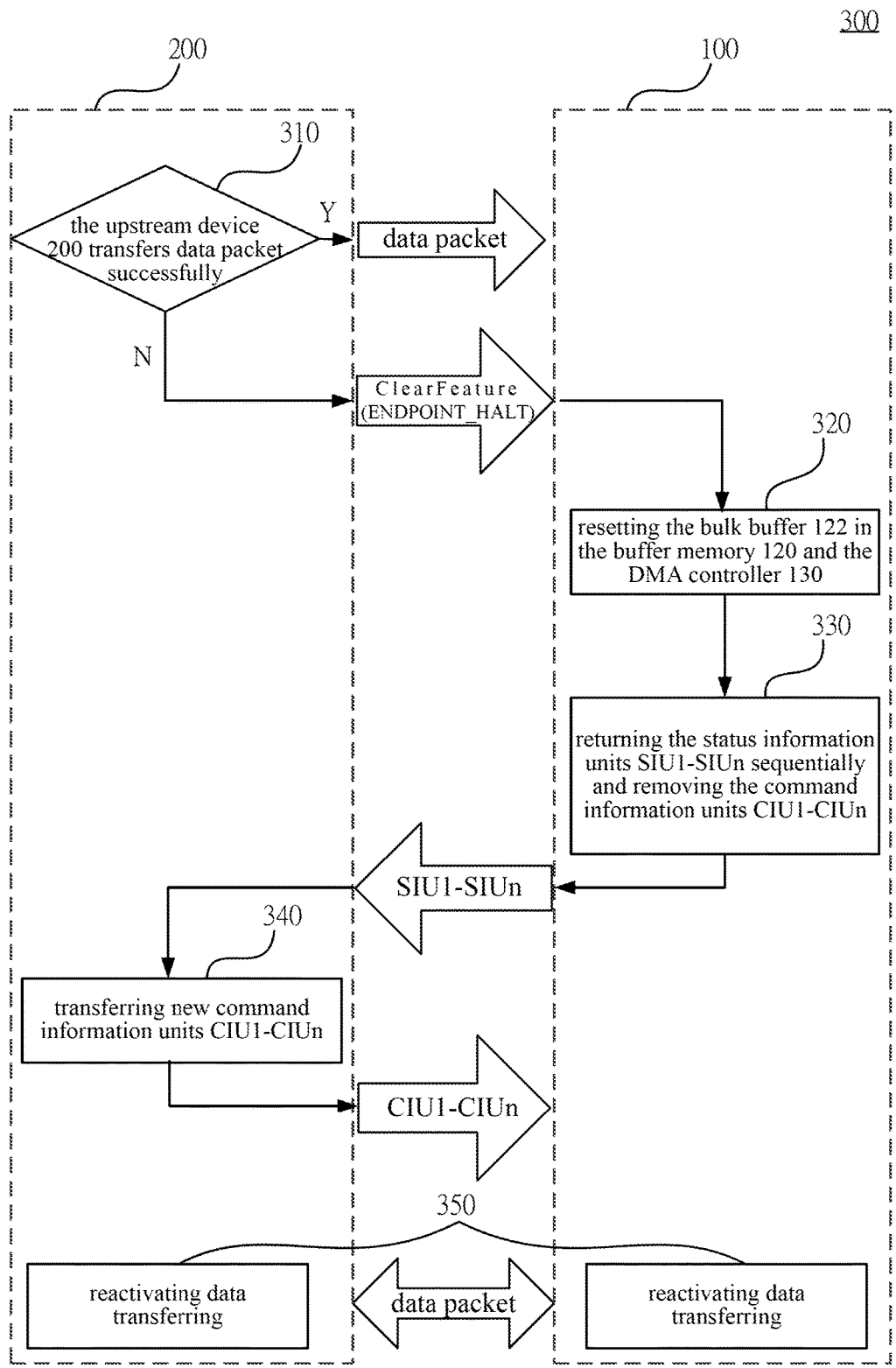
FIG. 3 is a diagram illustrating a data transferring method according to some embodiments of the present disclosure.

Reference is made to FIG. 3. FIG. 3 is a diagram illustrating a data transferring method 300 according to some embodiments of the present disclosure. For better understanding, the data transferring method 300 depicted in FIG. 3 will be discussed in accompanying with the bridge device 100 in FIG. 1 and FIG. 2, but the present disclosure is not limited thereto. As shown in the drawing, the data transferring method 300 includes operations 310, 320, 330, 340 and 350.

As shown in the operation 310, when the upstream device 200 cannot transfer data packet successfully and the retry time reaches an upper limit (e.g., 3 times), the upstream device 200 sends a clear feature command ClearFeature (ENDPOINT_HALT) to the bridge device 100. In one embodiment, the clear feature command may be the CLEAR_FEATURE command defined in the Universal Serial Bus (USB) Protocol. In one embodiment, the upstream device 200 sends the clear feature command ClearFeature(ENDPOINT_HALT) to remove the status feature ENDPOINT_HALT, in which the status feature ENDPOINT_HALT is configured to indicate whether a halt condition is encountered at the endpoint.

When the bridge device 100 receives the clear feature command ClearFeature(ENDPOINT_HALT) from the upstream device 200, the bridge device 100 performs the operations 320 and 330 correspondingly.

As shown in the operation 320, when the bridge device 100 receives the clear feature command ClearFeature(ENDPOINT_HALT) from the upstream device 200, the bulk buffer 122 in the buffer memory 120 and the DMA controller 130 are reset by the processor 140 to remove the first data D1 and stop the data transferring between the upstream device 200 and the bridge device 100.

In the embodiments that the bridge device 100 includes the buffer memory 170, the operation 320 further includes: when the bridge device 100 receives the clear feature command ClearFeature(ENDPOINT_HALT) from the upstream device 200, the buffer memory 170 is reset by the processor 140 to remove the second data D2 and stop the data transferring between the bridge device 100 and the storage device 900.

As shown in the operation 330, after the processor 140 reset the bulk buffer 122, the DMA controller and the buffer memory 170, the processor 140 returns corresponding status information units SIU1-SIUn sequentially via the buffer memory 120 and the physical layer circuit 110 to the upstream device 200, to indicate abortion of the uncompleted command information units CIU1-CIUn in queue, and after returning one of the status information units SIU1-SIUn, the processor 140 removes the corresponding one of the command information units CIU1-CIUn stored in the command queue 124.

When the upstream device 200 receives the status information units SIU1-SIUn, and the command information units CIU1-CIUn in queue are all removed, the upstream device 200 may perform the operations 340 and 350.

In the operation 340, the upstream device 200 again transfer new command information units CIU1-CIUn to the bridge device 100. In the operation 350, data transferring may be reactivated between the upstream device 200 and the bridge device 100 according to the new command information units CIU1-CIUn in order to read or write the storage device 900.

Since the bulk buffer 122 and the buffer memory 170 are reset, and the command information units CIU1-CIUn previously stored in the command queue 124 are removed, when the upstream device 200 restart data transferring and transfer new command information units CIU1-CIUn, the tag IDs ID1-IDn will not overlap and correspond to different command information units CIU1-CIUn. Thus, failure resulted from tag overlapping during the upstream device 200 sending commands and performing data transferring, which causes pauses of the data transferring and the dropping of read/write performance, may be prevented and avoided. In one embodiment, when the tag overlapping occurs, pause time of the upstream device 200 may be up to 15 seconds, which significantly lowers the speed of the data transmission.

Figure 4:
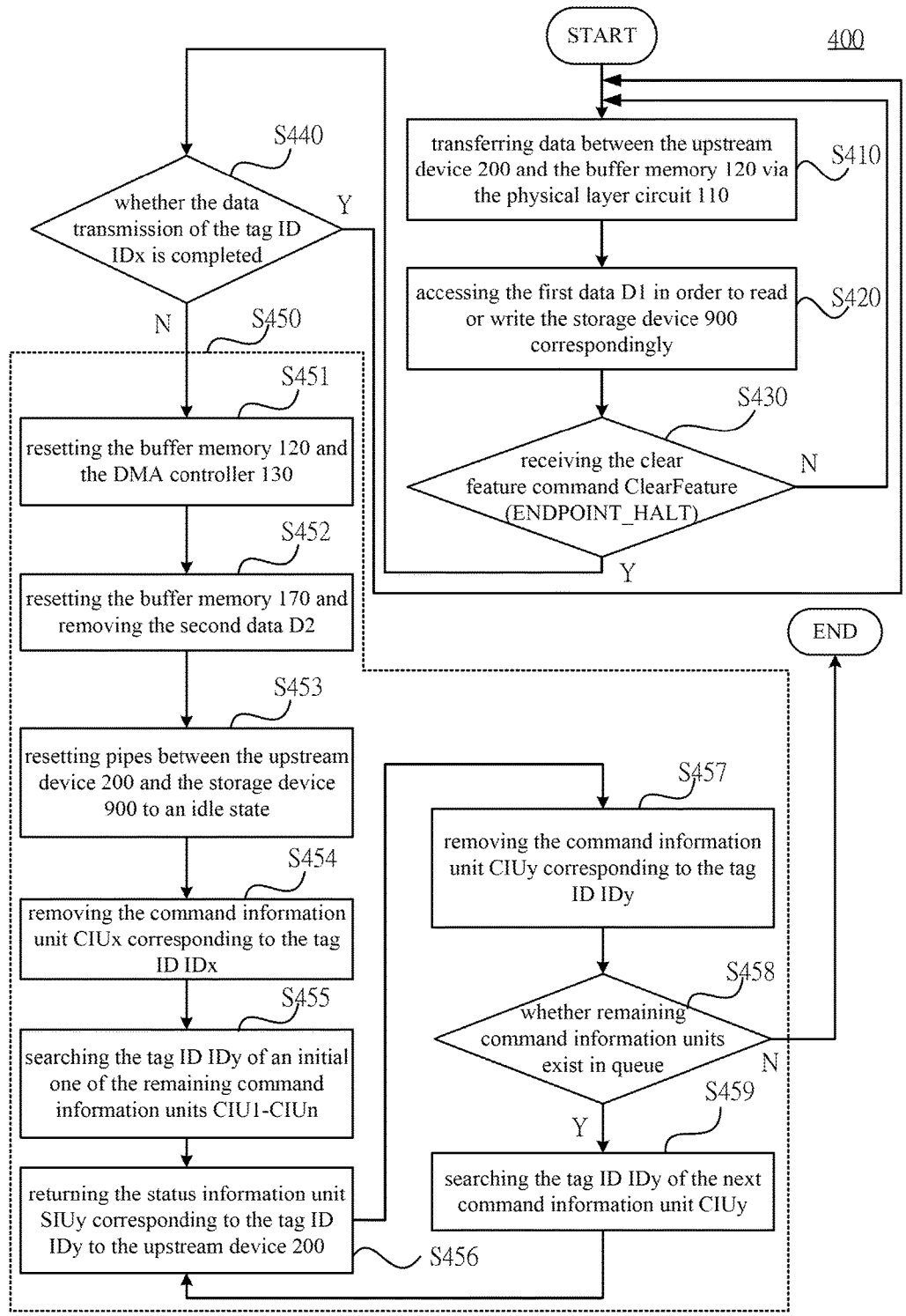
FIG. 4 is a flowchart diagram illustrating a data transferring method according to some embodiments of the present disclosure.

For the convenience of explanation to the specific operations of the bridge device 100 in the operations 320 and 330, reference is made to FIG. 4 together. FIG. 4 is a flowchart diagram illustrating a data transferring method 400 according to some embodiments of the present disclosure. The data transferring method 400 includes steps S410-S450.

In step S410, data is transferred between the upstream device 200 and the buffer memory 120 via the physical layer circuit 110.

In one embodiment, the step S410 further includes receiving and storing one or more command Information units CIU1-CIUn in queue from the upstream device 200 by the buffer memory 120. In one embodiment, the bridge device 100 may store the first data D1 in the bulk buffer 122 of the buffer memory 120, and store the command information units CIU1-CIUn in the command queue 124 of the buffer memory 120, in order to execute commands sequentially according to the command information units CIU1-CIUn in the command queue 124 to perform the following data transmission.

In step S420, the first data D1 stored in the bulk buffer 122 of the buffer memory 120 is accessed by the DMA controller 130, in order to read or write the storage device 900 correspondingly.

In one embodiment, the step S420 further includes transferring data between the buffer memory 120 and the buffer memory 170 by the DMA controller 130, accessing the second data D2 stored in the buffer memory 170 by the DMA controller 130, and transferring data between the storage device 900 and the buffer memory 170 via the physical layer circuit 160. Thus, the read/write process to the storage device 900 may be achieved by the cooperation and transmission of the buffer memory 120, the DMA controller 130 and the buffer memory 170.

In the step S430, when the bridge device 100 receives the clear feature command ClearFeature(ENDPOINT_HALT) from the upstream device 200, the step S440 is performed.

In the step S440, the processor 140 determines whether the data transmission of the current tag ID IDx is completed. If the data transmission of the tag ID IDx is completed, back to the step S410 to execute the data transmission corresponding to the next command. If the data transmission of the tag ID IDx is uncompleted, the step S450 is performed.

In one embodiment, the step S450 further includes steps S451, S452, S453, S454, S455, S456, S457, S458 and S459.

In the step S451, the processor 140 resets the buffer memory 120 and the DMA controller 130 to stop the data transferring between the upstream device 200 and the bridge device 100. In one embodiment, the processor 140 correspondingly resets the bulk buffer 122 and removes the first data D1.

In the step S452, the processor 140 resets the buffer memory 170 and removes the second data D2 to stop the data transferring between the bridge device 100 and the storage device 900.

In the step S453, the processor 140 resets a plurality of pipes (e.g., data-in pipe and data-out pipe) between the upstream device 200 and the storage device 900 to an idle state. In one embodiment, the processor 140 correspondingly clears the status feature ENDPOINT_HALT according to the clear feature command ClearFeature(ENDPOINT_HALT) so as to set the pipes to the idle state.

In the step S454, the processor 140 removes the command information unit CIUx corresponding to the current tag ID IDx without returning the corresponding status information unit SIUx.

In the step S455, the processor 140 searches the corresponding tag ID ID1 of an initial one (e.g., the command information unit CIU1) of the remaining command information units CIU1-CIUn in the command queue 124.

In the step S456, the processor 140 returns the status information unit SIU1 corresponding to the tag ID ID1 via the buffer memory 120 and the physical layer circuit 110 to the upstream device 200 to indicate abortion of the command information unit CIU1. In one embodiment, the bridge device 100 may store the status information units SIU1-SIUn corresponding to the tag IDs ID1-IDn in the status queue 126 of the buffer memory 120.

In the step S457, the processor 140 removes the command information unit CIU1 corresponding to the tag ID ID1 and stored in the command queue 124 after returning the status information unit SIU1 to the upstream device 200.

In the step S458, the processor 140 determines whether remaining command information units CIU2-CIUn exist in queue.

If the queueing command information units (e.g., the command information units CIU2-CIUn) exist, the step S459 is performed. In the step S459, the processor 140 searches the tag ID ID2 of the next command information unit (e.g., the command information unit CIU2). Thus, by repeating the above-mentioned steps S456-S459, the processor 140 may search the corresponding tag ID IDy of the command information unit CIUy sequentially, return the abortion command corresponding to the tag ID IDy to the upstream device 200 by the status information unit SIUy, and remove the command information unit CIUy so as to sequentially remove all the command information units CIU1-CIUn in the command queue 124, in which y is an integer from 1 to n.

On the condition that there are no queueing command information units CIU1-CIUn in the command queue 124, the process of the data transferring method 400 is complete and waiting for the upstream device 200 to input the new command information units. Thus, it may be guaranteed that no tag overlapping occurs between the upstream device 200 and the bridge device 100.

In summary, in various embodiments of the present disclosure, by resetting the buffer memory and the DMA controller in the bridge device and removing the command information unit in queue, the issue of the same tag ID repeatedly corresponds to different command information units may be avoided. Thus, after restarting the data transmission, no operational failure due to the tag overlapping, and thus no significant drops of the read/write performance resulted from the pause of the device.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A bridge device comprising:
a first physical layer circuit, configured to connect to an upstream device;
a first buffer memory, configured to store a first data and transfer data to the upstream device via the first physical layer circuit;
a second physical layer circuit, configured to connect to a storage device;
a second buffer memory, configured to store a second data and transfer data to the storage device via the second physical layer circuit;
a direct memory access (DMA) controller electrically coupled to the first buffer memory and configured to access the first data in the first buffer memory to read or write the storage device correspondingly, and electrically coupled to the second buffer memory and configured to access the second data in the second buffer memory to read or write the storage device correspondingly; and a processor, electrically coupled to the first buffer memory and the DMA controller;

wherein when the bridge device receives a clear feature command from the upstream device, the processor is configured to reset the first buffer memory and the DMA controller to stop the data transferring between the upstream device and the bridge device.

2. The bridge device of claim 1, wherein when the bridge device receives the clear feature command from the upstream device, the processor is further configured to reset the second buffer memory to stop the data transferring between the bridge device and the storage device.

3. The bridge device of claim 1, wherein the first buffer memory comprises a bulk buffer, and the bulk buffer is configured to store the first data.

4. The bridge device of claim 1, wherein when the bridge device receives the clear feature command from the upstream device, the processor is further configured to reset a plurality of pipes between the upstream device and the storage device to an idle state.

5. The bridge device of claim 1, wherein the first buffer memory is further configured to receive and store one or more command Information units in queue; and when the bridge device receives the clear feature command from the upstream device, the processor is further configured to remove the one or more command information units stored in the first buffer memory.

6. The bridge device of claim 5, wherein the first buffer memory comprises a command queue, and the command queue is configured to store the one or more command information units.

7. The bridge device of claim 5, wherein the processor is further configured to respectively return one or more corresponding status information units via the first buffer memory and the first physical layer circuit to the upstream device to indicate abortion of the one or more command information units.

8. The bridge device of claim 7, wherein the first buffer memory comprises a status queue, and the status queue is configured to store the one or more status information units.

9. The bridge device of claim 1, further comprising:

a memory, electrically coupled to the processor and configured to store a firmware, wherein the processor is configured to execute the firmware to control the first buffer memory and the DMA controller.

10. A data transferring method, comprising:

transferring data between an upstream device and a first buffer memory in a bridge device via a first physical layer circuit;

accessing a first data stored in the first buffer memory by a DMA controller in the bridge device, in order to read or write a storage device correspondingly;

transferring data between the first buffer memory and a second buffer memory in the bridge device by the DMA controller;

accessing a second data stored in the second buffer memory by the DMA controller;

transferring data between the storage device and the second buffer memory via a second physical layer circuit; and resetting the first buffer memory and the DMA controller by the processor to stop the data transferring between the upstream device and the bridge device when the bridge device receives a clear feature command from the upstream device.

11. The data transferring method of claim 10, further comprising:

resetting the second buffer memory by the processor to stop the data transferring between the bridge device and the storage device when the bridge device receives the clear feature command from the upstream device.

12. The data transferring method of claim 10, further comprising:

storing the first data in a bulk buffer of the first buffer memory.

13. The data transferring method of claim 10, further comprising:

resetting a plurality of pipes between the upstream device and the storage device to an idle state by the processor when the bridge device receives the clear feature command from the upstream device.

14. The data transferring method of claim 10, further comprising:

receiving and storing one or more command Information units in queue from the upstream device by the first buffer memory; and respectively returning one or more corresponding status information units via the first buffer memory and the first physical layer circuit to the upstream device by the processor to indicate abortion of the one or more command information units when the bridge device receives the clear feature command from the upstream device.

15. The data transferring method of claim 14, further comprising:

storing the one or more command information units in a command queue of the first buffer memory.

16. The data transferring method of claim 14, further comprising:

storing the one or more status information units in a status queue of the first buffer memory.

17. The data transferring method of claim 14, further comprising:

removing the corresponding one or more command information units stored in the first buffer memory by the processor after returning the one or more status information units to the upstream device.

18. The data transferring method of claim 14, wherein the operation of respectively returning the one or more status information units to the upstream device comprises:

searching one or more corresponding tag IDs of the one or more command information units sequentially, and returning an abortion command corresponding to the one or more tag IDs to the upstream device by the one or more status information units.

* * * * *